United States Patent [19]

Ishizaki

[11] Patent Number: 4,623,501
[45] Date of Patent: Nov. 18, 1986

[54] METHOD AND APPARATUS FOR COATING A SUBSTRATE

[75] Inventor: Keiichi Ishizaki, Kanagawa, Japan

[73] Assignee: Fuji Photo Film Co., Ltd., Kanagawa, Japan

[21] Appl. No.: 651,569

[22] Filed: Sep. 18, 1984

[30] Foreign Application Priority Data

Sep. 19, 1983 [JP] Japan ................................. 58-172830

[51] Int. Cl.$^4$ ............................................. B29C 39/20
[52] U.S. Cl. .................................. 264/171; 118/410; 118/411; 264/216; 264/217; 425/131.1; 425/224; 425/461; 425/462; 427/127; 427/412.3; 427/414
[58] Field of Search ............... 264/171, 207, 216, 217; 425/131.1, 224, 462, 461; 118/411, 410, 412; 427/412.3, 414, 127

[56] References Cited

U.S. PATENT DOCUMENTS

| | | | |
|---|---|---|---|
| 2,295,280 | 9/1942 | Fordyce | 425/224 |
| 2,679,661 | 6/1954 | Bennes et al. | 264/207 |
| 2,681,294 | 6/1954 | Beguin | 264/212 |
| 2,761,791 | 9/1956 | Russell | 264/176 R |
| 2,932,855 | 4/1960 | Bartlett et al. | 264/217 |
| 3,072,962 | 1/1963 | McDermott et al. | 264/171 |
| 3,308,222 | 3/1967 | Kovacs | 264/165 |
| 3,360,825 | 1/1968 | Tsuda et al. | 425/224 |
| 4,145,173 | 3/1979 | Pelzer et al. | 425/224 |
| 4,348,346 | 9/1982 | Thompson | 425/131.1 |
| 4,469,782 | 9/1984 | Ishiwata et al. | 264/176 R |

*Primary Examiner*—Jeffery Thurlow
*Attorney, Agent, or Firm*—Sughrue, Mion, Zinn, Macpeak, and Seas

[57] ABSTRACT

A coating method and apparatus in which a coating composition is uniformly coated onto a continuously moving web without accumulation of thickened composition in the coating head. Auxiliary supply pipes open into the cavity of the coating head at both ends of the cavity. Liquid is either supplied through the auxiliary supply pipes to the coating head, or a portion of the coating composition contained in the coating head is discharged through the auxiliary supply pipes. Preferably, the supply or discharge of the liquid through the auxiliary supply pipes is at a rate such that a ratio of a velocity component of the liquid flowing through the auxiliary supply pipes to that of the coating composition onto the moving web is in a range of 0.01 to 10.

10 Claims, 5 Drawing Figures

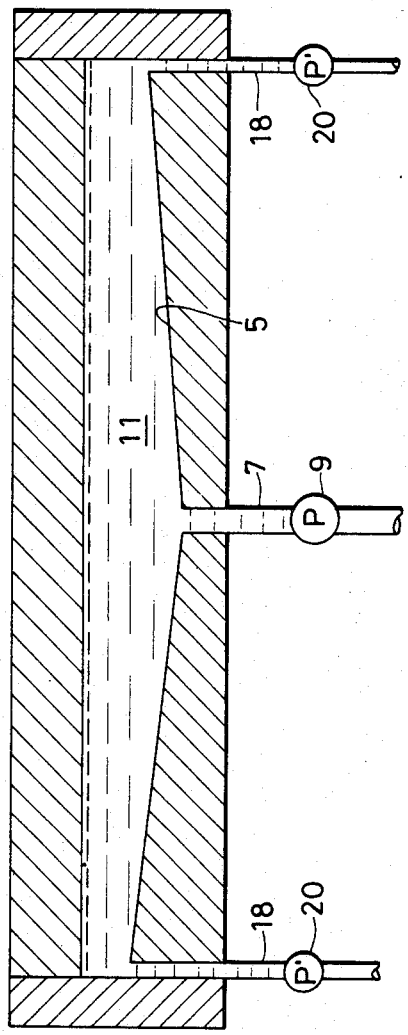
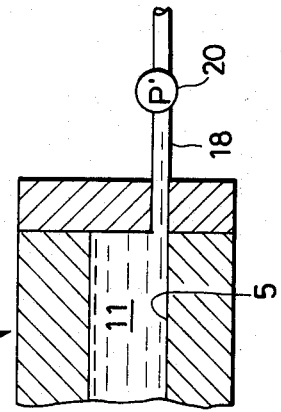
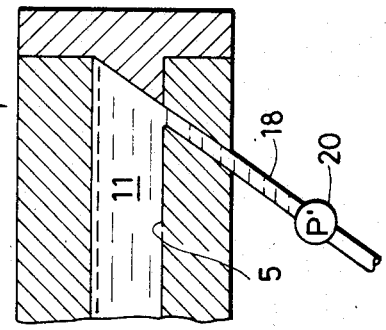

METHOD AND APPARATUS FOR COATING A SUBSTRATE

BACKGROUND OF THE INVENTION

The present invention relates to a coating apparatus and method. More particularly, the invention relates to a method and apparatus for coating a substrate in which, in order to manufacture photographic photosensitive materials such as photographic film and photographic paper or magnetic recording materials such as magnetic recording tapes, photographic emulsion or magnetic solution is applied to a long belt-like substrate (hereinafter referred to as a web).

Methods with which various coating composition are applied to supports of plastic film or paper and are then dried to manufacture desired products are extensively employed in a variety of manufacturing applications, such as in the manufacture of photographic film or paper, magnetic recording materials, pressure-sensitive recording sheets, and heat-sensitive recording sheets.

An example of a method which is extensively utilized for applying a coating composition is a method using a multilayer slide bead coating device as proposed by Russell et al. in U.S. Pat. No. 2,761,791. In this method, a plurality of coating compositions flowing down slide surfaces are caused to form a bead at a position below the slide surface where the coating compositions meet the web, which is continuously conveyed, so that the coating operation is achieved with the aid of the bead.

In such a conventional coating device, as shown in FIG. 1, a coating head 3 is disposed adjacent to a web 2 which is conveyed while being guided by a coating backing roll 1. Metering pumps 8 and 9 supply coating compositions 10 and 11 through main supply pipes 6 and 7 into cavities 4 and 5 in the coating head 3, respectively. The coating compositions thus supplied are extruded in the form of ribbons from slots 12 and 13, thus flowing, as two layers, down a slide surface. The two layers flow down the slide surfaces without mixing to a bead section 14 where the two layers are applied to the web simultaneously. A pressure reducing chamber 15 is connected to a vacuum pump 16, thus serving as a bead stabilizing back pressure supply.

In a coating method such as the above-described slide bead coating method, an extrusion bead coating method, a hopper coating method, or a curtain coating method in which a coating composition is supplied through a main supply pipe into a cavity formed in the coating head and is then extruded through a slot communicating with the cavity for application to the web, the uniformity of coating in the lateral direction of the web depends on the uniformity of the slot. Accordingly, in order to obtain satisfactory coating results, it is essential to form the slot with a very high accuracy.

Another serious drawback is that the residue of the coating composition in the slot and the cavity has a tendency to solidify, thus lowering the uniformity of coating in the lateral direction of the web. Moreover, the residue can flake off and be coated on the web, as a result of which the quality of the coated product is greatly lowered. It is considerably difficult to remove the residue of the coating composition through the slot, and accordingly it takes a relatively long period of time for cleaning the coating device.

This phenomenon is attributed to the fact that, when coating is carried out for long periods, some amounts of the coating composition are stagnated in the cavity of the coating head. Specifically, in the case of photographic emulsion, a gelatin bridge of a hardening agent, whose viscosity increases with time, tends to be created. Also, in the case of magnetic solutions, a condensate of a dispersing agent is created, and the material thus created accumulates in the cavity or sticks to the slot.

Typically, a metering pump is operated to supply the coating composition through a main supply pipe to the cavity in the coating head, and the coating composition thus supplied is passed to the slot, which governs the uniformity of coating in the lateral direction of the web. Accordingly, the coating composition is abruptly spread over the entire width of the coating head, and therefore the coating composition is liable to be stagnated at both ends, in the lateral direction, of the cavity. It is considerably difficult to design the cavity so that, in applying a coating composition having certain properties under certain coating conditions, stagnation of the coating composition is entirely eliminated. Especially in the case of a general-purpose coating head, stagnation of the coating composition occurs unavoidably.

SUMMARY OF THE INVENTION

An object of this invention is to prevent the stagnation of the coating composition at both ends of the cavity in the coating head, which is the main cause for lowering the quality of the product. In other words, an object of the invention is to completely suppress the occurrence of stagnation of the coating composition, thereby to prevent the occurrence of coating problems such as formation of longitudinal stripes due to the stagnation of coating composition for a long period of time in the coating head.

The foregoing object and other objects of the invention have been achieved by the provision of a coating method and apparatus in which auxiliary supply pipes are provided which open into the cavity at both ends, and a part of the coating composition or a liquid different therefrom is injected through the auxiliary supply pipes or a part of the coating composition is discharged through the auxiliary supply pipes, whereby a coating operation is carried out while preventing the coating composition from being stagnated in the cavity.

BRIEF DESCRIPTION OF THE DRAWINGS

FIG. 3 is a cross-sectional front view of the coating device in FIG. 2; and

FIGS. 4 and 5 are cross-sectional front views showing essential components of examples of a coating device to which the coating method according to the invention is applied.

DESCRIPTION OF THE PREFERRED EMBODIMENTS

The present invention will be described with reference to the accompanying drawings in more detail.

Figure 1:
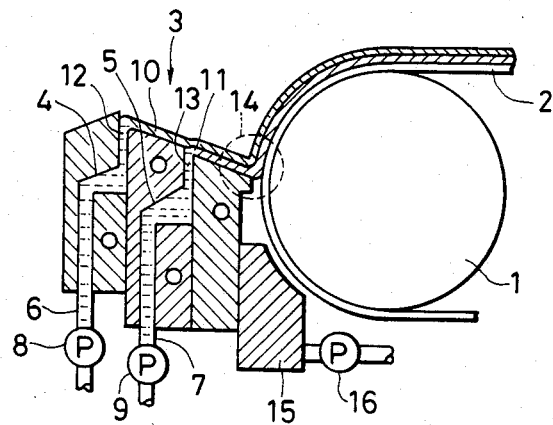
FIG. 1 is a sectional side view showing a conventional coating device.
Figure 2:
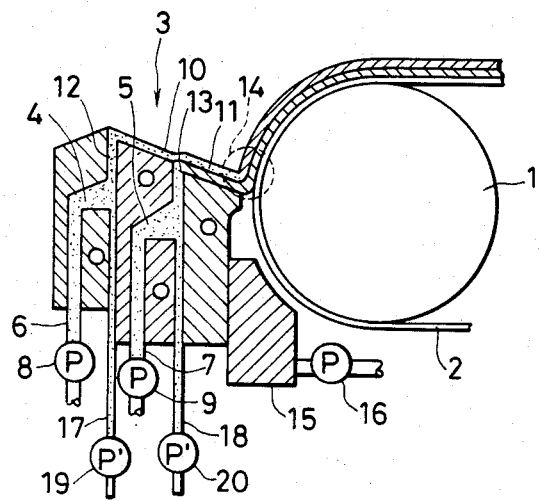
FIG. 2 is a cross-sectional side view showing a coating device to which a coating method according to the invention is applied.

A coating device for practicing a coating method according to the invention is shown in FIGS. 2 and 3, where like reference numerals designate like components in FIG. 1. The coating device is provided with auxiliary supply pipes 17 and 18 which open into the cavities 4 and 5, respectively, at both ends in the lateral direction. Metering pumps 19 and 20 are operated to inject coating compositions 10 and 11, or different liquids, or to discharge coating compositions 10 and 11 through the auxiliary supply pipes so that the coating operation is achieved while preventing the coating compositions 10 and 11 from being stagnated in the cavities 4 and 5.

FIGS. 4 and 5 show other examples of the auxiliary supply pipe 18, which differ from the one shown in FIGS. 2 and 3 in the opening angle with respect to the cavity 5.

In general, a coating composition for a recording material has a viscosity of 1 to 1,000,000 cps and a surface tension of 15 to 50 dyn/cm. In practice, the coating quantity is 1 to 500 cc/m$^2$, the coating velocity is 10 to 1000 m/min, and the coating width is 50 to 500 cm.

The case will be considered where the above-described coating compositions or different liquids are injected through the auxiliary supply pipes. Hereinafter, coating compositions supplied through the main supply pipes will be referred to as "primary streams", and coating compositions or different liquids supplied or discharged through the auxiliary supply pipes will be referred to as "secondary streams".

The ratio R of the velocity component, in the direction of the slot, of the secondary stream to that of the primary stream at the liquid contact start point (the opening of the auxiliary supply pipe) in the cavity is as follows:

$$R = V(S)/V(M)$$
$$= \frac{Q(S)/(L(S) \cdot D(S))}{Q(M)/(L(M) \cdot D(M))}$$
$$= \frac{Q(S)/A(S)}{Q(M)/A(M)},$$

where,
V(S): the velocity component of the secondary stream in the direction of the slot at the liquid contact start point where the secondary stream meets the primary stream;
Q(S): the flow rate of the secondary stream;
L(S): the width of the opening of the auxiliary supply pipe;
D(S): the depth of the opening of the auxiliary supply pipe;
A(S): the area of the opening of the auxiliary supply pipe;
V(M): the velocity component of the primary stream in the direction of the slot at the liquid contact start point where the primary stream meets the secondary stream;
Q(M): the flow rate of the primary steam;
L(M): the width of the cavity;
D(M): the depth of the cavity; and
A(M): the area of the cavity.

The stagnation eliminating effect brought about by injection of the secondary stream is suitably obtained under the following condition:

$$0.01 \leq R \leq 10.$$

Preferably, $$0.1 \leq R \leq 1.$$

In the case of R<0.01, the drag force of the secondary stream, which is the driving force for eliminating the stagnation of the primary stream, becomes small so that the stagnation eliminating effect becomes small. In the case of R>10, in the primary stream side region near the opening of the auxiliary supply pipe, the flow lines of the primary stream are greatly bent, thus enhancing the tendency to stagnate coating composition.

In the case where a coating composition different from the primary stream is injected, the coating width of the secondary coating composition becomes excessively large, as a result of which the secondary coating composition flows over to the product, thus lowering the coating efficiency.

The case where a coating composition is discharged through the auxiliary supply pipe will now be considered. Fundamentally, if a part of the primary stream is discharged in succession with the coating composition, the stagnation of the primary stream can be eliminated. If, for convenience in description, the velocity component ratio R is used, then the best range is:

$$0.01 \leq R \leq 10.$$

This is completely the same as that in the case of injection.

Preferably, $$0.1 \leq R \leq 1.$$

In the case of R<0.01, only stagnation of the primary stream very near the opening of the auxiliary supply pipe can be eliminated. In the case of R>10, the stream flowing out of the slot is dragged by the discharge stream (auxiliary stream), and therefore its flow rate is lowered, as a result of which the coating quantity in the direction of the coating width cannot be maintained uniform.

The web used in the coating method of the invention may be made of paper, plastic film, metal, resin-coated paper or synthetic paper. Examples of the material of the plastic film are polyolefins such as polyethylene or polypropylene, vinyl copolymers such as polyvinyl acetate, polyvinyl chloride or polystyrene, polyamides such as 6,6-nylon or 6-nylon, polyesters such as polyethylene terephthalate, polyethylene-2 or 6-naphthalate, and cellulose acetates such as polycarbonate, cellulose triacetate or cellulose diacetate. A typical example of the resin used for the resin-coated paper is polyolefin including polyethylene. However, the resin-coated paper may be made of other materials. An example of the metal web is an aluminum web.

In order to clarify the effects of the invention, specific examples of the coating method of the invention will be described:

EXAMPLE 1

A multi-layer slide hopper type coating device similar to the one shown in FIGS. 2 and 3 having six slide surfaces was used to simultaneously apply coating compositions for photographic color paper in the form of six layers, as described below, to a polyethylene laminate paper with a coating width of 100 cm. The coating compositions were as follows:

first layer (lowermost layer): blue-sensitive gelatino silver-halide emulsion having a viscosity of 60 cps at 40° C.;
second layer: aqueous gelatin solution having a viscosity of 60 cps at 40° C.;

third layer: green-sensitive gelatino silver-halide emulsion having a viscosity of 60 cps at 40° C.;

fourth layer: aqueous gelatin solution containing an ultraviolet ray absorbent and having a viscosity of 60 cps at 40° C.;

fifth layer: red-sensitive gelatino silver-halide emulsion having a viscosity of 60 cps at 40° C.; and sixth layer: aqueous gelatin solution containing a surface active agent and having a viscosity of 40 cps at 40° C.

In the coating operation, the coating compositions of the first, third and fifth layers were supplied as primary streams through the main supply pipes at flow rates of 2548 cc/min, 2548 cc/min and 1960 cc/min, respectively, while the same coating compositions as those of the primary streams were continuously injected as secondary streams through the auxiliary supply pipes which opened on both sides of the cavities for the coating compositions of the first, third and fifth layers at flow rates of 26, 26 and 20 cc/min, respectively, for the auxiliary supply pipes on one side.

In the example, R=1.0. It was confirmed that the coating problem heretofore caused by the stagnation of the blue-sensitive layer, the green-sensitive layer or the red-sensitive layer which typically arose after several tens of hours did not arise even after several hundreds of hours.

EXAMPLE 2

A multi-layer slide hopper type coating device similar in construction to the one shown in FIGS. 2 and 5 having six slide surfaces was used to repeatedly perform the same coating operation as that in Example 1.

In the coating operation, the coating compositions of the first, third and fifth layers were supplied as primary streams through the main supply pipes at flow rates of 2613 cc/min, 2613 cc/min and 2010 cc/min, respectively, while parts of the primary streams were continuously discharged as secondary streams through the auxiliary supply pipes which opened on both sides of the cavities for the coating compositions of the first, third and fifth layers, with flow rates of 6.5, 6.5 and 5 cc/min, respectively, for the auxiliary supply pipes on one side.

In this example, R=0.25. As in Example 1, it was confirmed that the coating problem caused by stagnation of the blue-sensitive layer, the green-sensitive layer or the red-sensitive layer which typically arose after several tens of hours did not arise even after several hundreds of hours.

As is apparent from the above-described examples, the formation of stagnations of coating compositions in the cavities of the coating head is suppressed with the use of the invention. Therefore, the occurrence of coating problems such as the formation of longitudinal stripes due to the stagnation of coating compositions can be prevented for a long period of time.

The invention is of course not limited to the above-described embodiments. That is, the above-described embodiments may be changed or modified in various manners. For instance, the auxiliary supply pipes shown in FIGS. 3, 4 and 5 may be arranged in such a manner that the right and left ones are asymmetrical with each other. The invention is applicable not ony to the coating head of the above-described multi-layer slide hopper type coating device, but also to a coating head having cavities such as that of a curtain coating device or an extrusion coating device.

I claim:

1. A coating method in which a coating composition is supplied through a main supply pipe into a cavity in a coating head and extruded through a slot communicating with the cavity so as to be applied to moving web, and wherein said coating composition tends to stagnate in said cavity and solidify in said slot, comprising the steps of:

providing auxiliary supply pipes opening into said cavity at both ends of said cavity; and supplying a liquid through said auxiliary supply pipes to said coating head to prevent stagnation of said coating composition in said cavity and solidification in said slot.

2. The coating method as claimed in claim 1, wherein said liquid is supplied at a rate such that a ratio of a velocity component of said liquid to that of coating composition is in the range of 0.01 to 10.

3. The method as claimed in claim 1, wherein said liquid is a portion of said coating composition.

4. A coating method in which a coating composition is supplied through a main supply pipe into a cavity in a coating head and extruded through a slot communicating with the cavity so as to be applied to a moving web, and wherein said coating composition tends to stagnate in said cavity and solidify in said slot, comprising the steps of:

providing auxiliary supply pipes opening into said cavity at both ends of said cavity; and discharging a portion of said coating composition from said coating head through said auxiliary supply pipes to prevent stagnation of said coating composition in said cavity and solidification in said slot.

5. The coating method as claimed in claim 4, wherein said coating composition is discharged through said auxiliary supply pipes at a rate such that a ratio of a velocity component of the coating composition discharged through said auxiliary supply pipes to that of said coating composition being coated on said web is in a range of 0.01 to 10.

6. A coating apparatus in which a coating composition is supplied into a cavity in a coating head and extruded through a slot communicating with the cavity so as to be applied to a moving web continuously, comprising:

a main supply pipe to supply coating composition into said cavity;

auxiliary supply pipes opening into said cavity at both ends of said cavity; and pump means for supplying liquid through said auxiliary supply pipes to said coating head for preventing stagnation of coating composition in said coating head.

7. The coating apparatus as claimed in claim 6, wherein said supplying means supplies said liquid at a rate such that a ratio of a velocity component of said liquid to that of said coating composition is in the range of 0.01 to 10.

8. The apparatus as claimed in claim 6, wherein said liquid supplied by said supplying means comprises a a portion of said coating composition.

9. A coating apparatus in which a coating composition is supplied into a cavity in a coating head and extruded through a slot communicating with the cavity so as to be applied to a moving web continuously, comprising:

a main supply pipe to supply coating composition into said cavity;

auxiliary supply pipes opening into said cavity at both ends of said cavity; and pump means for discharging a portion of said coating composition from said coating head through said auxiliary supply pipes and for preventing stagnation of coating composition in said coating head.

10. The coating apparatus as claimed in claim 9, wherein said discharging means discharges said coating composition at a rate such that a ratio of velocity component of said composition to that of said coating composition is in the range of 0.01 to 10.

* * * * *